(12) United States Patent
Lin

(10) Patent No.: US 7,041,243 B2
(45) Date of Patent: *May 9, 2006

(54) 5-LAYER CO-EXTRUDED BIAXIAL-ORIENTED POLYPROPYLENE SYNTHETIC PAPER AND ITS PRODUCTION PROCESS

(75) Inventor: Allen Fong-Chin Lin, Taipei (TW)

(73) Assignee: Nan Ya Plastics Corp., Taipei (TW)

( * ) Notice: Subject to any disclaimer, the term of this patent is extended or adjusted under 35 U.S.C. 154(b) by 89 days.

This patent is subject to a terminal disclaimer.

(21) Appl. No.: 10/722,403

(22) Filed: Nov. 28, 2003

(65) Prior Publication Data

US 2005/0118410 A1   Jun. 2, 2005

(51) Int. Cl.
*B29C 47/06*   (2006.01)

(52) U.S. Cl. .............................. 264/45.9; 264/173.14; 264/173.15; 264/288.8; 264/290.2

(58) Field of Classification Search ................. None
See application file for complete search history.

(56) References Cited

U.S. PATENT DOCUMENTS

| 3,773,608 | A | * | 11/1973 | Yoshimura et al. ........ 428/141 |
| 3,894,904 | A | * | 7/1975 | Cook ........................ 156/229 |
| 4,163,080 | A | | 7/1979 | Buzio et al. |
| 4,259,412 | A | | 3/1981 | Buzio et al. |
| 4,419,411 | A | | 12/1983 | Park |
| 4,522,887 | A | * | 6/1985 | Koebisu et al. ............ 428/461 |
| 4,578,316 | A | | 3/1986 | Clauson et al. |
| 4,588,648 | A | | 5/1986 | Krueger et al. |
| 4,604,324 | A | | 8/1986 | Nahmias et al. |
| 4,613,547 | A | | 9/1986 | Wagner, Jr. et al. |
| 4,725,466 | A | | 2/1988 | Crass et al. |
| 4,764,404 | A | | 8/1988 | Genske et al. |
| 4,769,284 | A | | 9/1988 | Kakugo et al. |
| 4,786,562 | A | | 11/1988 | Kakugo et al. |
| 4,956,232 | A | | 9/1990 | Balloni et al. |
| 4,986,866 | A | * | 1/1991 | Ohba et al. ................ 156/220 |
| 5,281,376 | A | | 1/1994 | Hara et al. |
| 5,422,175 | A | * | 6/1995 | Ito et al. ................... 428/304.4 |
| 5,552,011 | A | | 9/1996 | Lin |
| 5,695,838 | A | | 12/1997 | Tanaka et al. |
| 5,700,564 | A | * | 12/1997 | Freedman ................... 428/332 |
| 5,800,913 | A | | 9/1998 | Mauer et al. |
| 5,861,201 | A | * | 1/1999 | Blackwelder et al. .... 428/36.91 |
| 5,888,636 | A | | 3/1999 | Asanuma et al. |
| 5,928,776 | A | | 7/1999 | Shioya et al. |
| 5,935,697 | A | | 8/1999 | Gasse et al. |
| 5,935,903 | A | * | 8/1999 | Goss et al. ................. 503/227 |

(Continued)

FOREIGN PATENT DOCUMENTS

JP    2000-211008    *   8/2000

*Primary Examiner*—Mark Eashoo
(74) *Attorney, Agent, or Firm*—Stevens, Davis, Miller & Mosher, LLP

(57) ABSTRACT

The invention discloses a 5-layer co-extruded biaxial-oriented polypropylene synthetic paper which is a 5-layer laminated structure with thickness between 30–300 μm comprising the uppermost layer (A) of paper sheet or resin, the second layer (B) of paper sheet or resin, the intermediate foamed layer (C), the forth layer (D) of paper sheet or resin and the bottom layer (E) of paper sheet or resin which is to improve the rigidity and stiffness covering power, strength between layers, glossiness of paper surface, paper thickness and the printability of the conventional synthetic paper.

3 Claims, 2 Drawing Sheets

U.S. PATENT DOCUMENTS

| | | | |
|---|---|---|---|
| 6,001,290 A * | 12/1999 | Lin ............................ 264/129 |
| 6,087,079 A * | 7/2000 | Newberry et al. .......... 430/510 |
| 6,270,912 B1 | 8/2001 | Peet |
| 6,280,833 B1 | 8/2001 | Peiffer et al. |
| 6,332,940 B1 * | 12/2001 | Lin ............................ 156/229 |
| 6,364,988 B1 | 4/2002 | Lin |
| 6,368,543 B1 | 4/2002 | Lin |
| 6,379,605 B1 | 4/2002 | Lin |
| 6,514,598 B1 * | 2/2003 | Totani et al. ................ 428/206 |
| 6,599,453 B1 * | 7/2003 | Lin .............................. 264/80 |
| 6,640,709 B1 | 11/2003 | Lowrance |
| 2002/0098339 A1 * | 7/2002 | Hanada et al. ........... 428/318.4 |

* cited by examiner

US 7,041,243 B2

5-LAYER CO-EXTRUDED BIAXIAL-ORIENTED POLYPROPYLENE SYNTHETIC PAPER AND ITS PRODUCTION PROCESS

BACKGROUND OF THE PRESENT INVENTION

1. Field of the Present Invention

The invention relates a 5-layer co-extruded biaxial-oriented polypropylene synthetic paper; particularly the formula of composition of the material for making the laminated 5-layer co-extruded biaxial-oriented polypropylene synthetic paper which can improve the rigidity and stiffness, covering power, paper glossiness and printability of the conventional co-extruded biaxial-oriented polypropylene synthetic paper.

2. Description of Prior Act

During the recent 15 years the inventor of the present invention has devoted all the efforts in enhancing the quality of the 3-layer co-extrude biaxial-oriented polypropylene synthetic paper for the goal of using said synthetic paper to supersede natural paper, and has been granted many patents including U.S. Pat. Nos. 5,551,511; 6,001,290; 6,364,988 and 6,379,605.

However the 3-layer co-extruded biaxial-oriented polypropylene synthetic paper (20) commonly known in the past has a 3-layer laminated structure as depicted in FIG. 1 which comprises the uppermost layer (A1) of paper sheet or resin, the intermediate foamed layer (B1), and the bottom layer (C1) of paper sheet or resin.

SUMMARY OF THE PRESENT INVENTION

The major purpose of the invention is to provide a 5-layer co-extruded biaxial-oriented polypropylene synthetic paper to improve the rigidity, stiffness covering power, surface glossiness and printability of the conventional 3-layer co-extruded biaxial-oriented polypropylene synthetic paper, and to achieve the advantages of more stable quality, substantially raised production speed and largely reduced production cost.

BRIEF DESCRIPTION OF THE DRAWING FIGURES

DETAILED DESCRIPTION OF THE PREFERRED EMBODIMENTS

Figure 2:
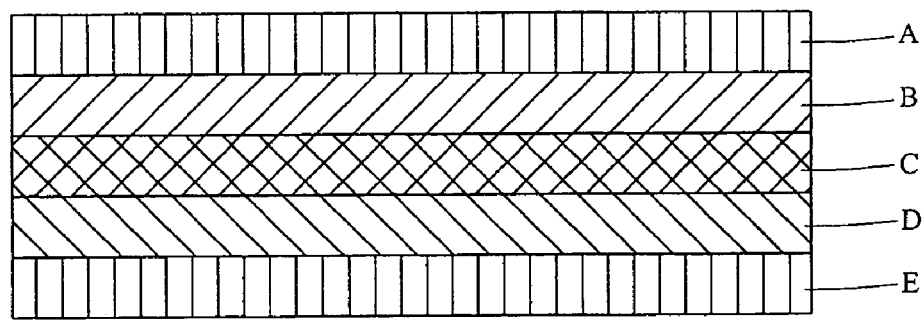
FIG. 2 shows the laminated structure of the 5-layer co-extruded biaxial-oriented polypropylene synthetic paper of the invention.

Referring to the FIG. 2, the 5-layer co-extruded biaxial-oriented polypropylene synthetic paper (15) of the invention has a 5-layer laminated structure which comprises the uppermost layer (A) of paper sheet or resin, the second layer (B) of paper sheet or resin, the intermediate foamed layer (C), the forth layer (D) of paper sheet or resin and the bottom layer (E) of paper sheet or resin.

The 5-layer co-extruded biaxial-oriented polypropylene synthetic paper (15) of the invention can break through the limitation of the physical properties and production cost of the commonly known 3-layer co-extruded biaxial-oriented polypropylene synthetic paper (20), and possesses the following five advantageous features:

1. The foamed layer (C) of the 5-layer co-extruded biaxial-oriented polypropylene synthetic paper has a more flexible range of adjustment of foaming ability which is beneficial to increasing production speed and stabilizing product quality.

Figure 1:
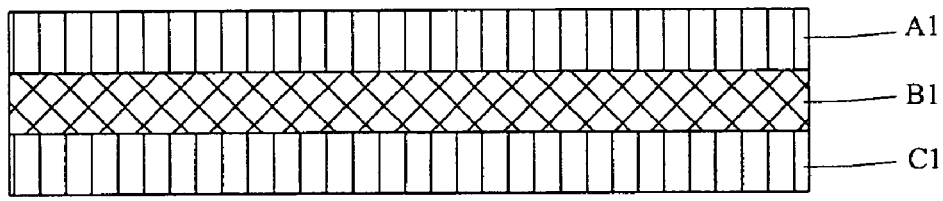
FIG. 1 shows the laminated structure of the commonly known 3-layer co-extruded biaxial-oriented polypropylene synthetic paper.

In the production process of the conventional 3-layer co-extruded biaxial-oriented polypropylene synthetic paper as shown in FIG. 1, if a product having lower specific weight is to be produced, the specific weight of the foamed layer (B1) must be brought down to a very low level by adding into the foamed layer the large amount of inorganic filler material to ensure the desired foaming effect. However, the large amount of filler material added into the foamed layer will cause large amount heat generated due to friction during extruding process that results in over-melting of the plastic material, and causes the extruding process unable to be operated in smooth condition. Consequently, in order to reduce the friction heat the extruding speed is lowered that will unavoidably result in an increase of production cost and unstable quality.

Whereas in the production of 5-layer co-extruded biaxial-oriented polypropylene synthetic paper (15) more layers are provided which enable a better adjustment of distribution of the filler material in different layers without lowering the extruding speed for reducing the friction heat. Therefore, the 5-layer co-extruded biaxial-oriented polypropylene synthetic paper is to provide the advantages of increasing the production speed and providing stable production quality.

2. Each layer of the 5-layer co-extruded biaxial-Oriented polypropylene synthetic paper is arranged to possess the covering power that is to avoid any decrease of production speed caused by seeking higher covering power of the synthetic paper.

This is further explained as follows:

When the covering power of the 3-layer co-extruding biaxial-oriented polypropylene synthetic paper (20) is to be increased, extra amount of inorganic powder shall be added into all or one of the three layers, but the introduction of the extra amount of inorganic powder will inevitably decrease the productivity and production efficiency.

However when a higher covering power is demanded for the 5-layer co-extruded biaxial-oriented polypropylene synthetic paper (15), same amount of inorganic powder is added to each of the five layers uniformly according to the desired manner of distribution. This reduces the extra amount of inorganic powder added to any specific layer while the covering power can still be increased to the same level without any detrimental effect on the production efficiency.

3. The paper surface improving assistant shall be applied only on the surface of the paper sheet or resin of the second layer (B) and the forth layer (D) that could effectively reduce the production cost and ensure the product quality.

The surface assistant for improving the electrostatic charge resistant and surface smoothness of the 3-layer co-extruded biaxial-oriented polypropylene synthetic paper is not appropriate for being applied on the surface layer (A1) or on the surface layer (C1), it can only be applied on the foamed layer (B1).

Whereas as for the case of 5-layer co-extruded biaxial-oriented polypropylene synthetic paper (15) of the invention the surface assistant for improving surface smoothness and electrostatic charge resistant can be applied on the second layer (B) of paper sheet or resin and the forth layer (D) of paper sheet or resin of smaller thickness that enable less amount of surface resistant for improving the electrostatic charge resistant and surface smoothness used in production. This therefore reduces the production cost, and ensures the printability of the uppermost surface of the paper sheet or resin of layer (A).

4. The 5-layer co-extruded biaxial-oriented polypropylene synthetic paper (15) has higher surface smoothness and glossiness, higher product rigidity, stiffness and strength between layers.

The surface smoothness and glossiness of the paper sheet layer (A1) or the paper sheet layer (C1) of the 3-layer co-extruded biaxial-oriented polypropylene synthetic paper (20) are apt to being affected by the foaming ability of the foamed layer (B1) and the inorganic powder added to the layer (B1). Additionally, the strength between layers is insufficient that causes the layers of the synthetic paper apt to separating from each other.

However as for the 5-layer co-extruded biaxial-oriented polypropylene synthetic paper (15) of the invention, since the foamed layer (C) can be arranged as the foamed and covering layer, and resin can be chosen as the material for the uppermost layer (A) of paper sheet or resin, the second layer (B) of paper sheet or resin, the forth layer (D) of paper sheet or resin and the bottom layer (E) of paper sheet and resin that enables the synthetic paper (15) to possess higher surface smoothness and glossiness, better rigidity and stiffness as well as higher strength between layers as compared with the 3-layer co-extruded biaxial-oriented polypropylene synthetic paper.

5. The thickness of the 5-layer co-extruded biaxial-oriented polypropylene synthetic paper (15) could be further increased.

As shown in the following Table 1 most of the commonly known 3-layer co-extruded biaxial-oriented polypropylene synthetic paper (20) have thickness between 30–250 μm, but the thickness of the 5-layer co-extruded biaxial-oriented polypropylene synthetic paper (15) of the present invention is between 30–300 μm, i.e., the product thickness can be increased for the 5-layer co-extruded biaxial-oriented polypropylene synthetic paper of the invention.

TABLE 1

|       | 3-layer co-extruded biaxial-oriented polypropylene synthetic paper (30~250 μm) | | | 5-layer co-extruded biaxial-oriented polypropylene synthetic paper (30~300 μm) | | | | |
|-------|------|--------|------|------|------|--------|------|------|
| Layer | A1   | B1     | C1   | A    | B    | C      | D    | E    |
| Thickness | 1~15 | 28~215 | 1~15 | 1~15 | 2~15 | 24~215 | 2~15 | 1~15 |

Besides, in the production of the 5-layer co-extruded biaxial-oriented polypropylene synthetic paper, the Melt Flow Index (MFI) of the composition material of each layer such as resin, inorganic powder and additives formulated in specific proportion must enable a smooth material flow in the 5-layer extruding die without any interference to cause failure of co-flow of any layer, and cooling problem of the extruded product which will result in imperfect and un-neat extruding sheet. Therefore, the formulated composition of the laminated layers is the key technique of the 5-layer co-extruded biaxial-oriented polypropylene synthetic paper (15) invented by the inventor.

After careful and ceaseless study of the relation between the formulated composition and the MFI value the inventor proposed the most ideal formula of composition as well as the related MFI of the laminated layers of the 5-layer co-extruded biaxial-oriented polypropylene synthetic paper. The detail is as follows:

1. The composition of the uppermost layer (A) of paper sheet or resin, the second layer (B) of paper sheet or resin, the intermediate foamed layer (C), the forth layer (D) of paper sheet or resin, and the bottom layer (E) of paper sheet or resin includes:

(a) resin including polypropylene, polyethylene and carbonate acid ester; and (b) master batch formed by the mixture of inorganic powder and additives could be selected from the group of calcium carbonate (heavy or light weight), titanium dioxide (A-type or R-type), diatomaceous earth, clay, calcium oxide, silicon dioxide and barium sulfate, which shall be treated by surface treatment process, and than blended with additives to form master batch with particle size between 0.05~15 μm.

2. Each of the layers of the paper sheet or resin layer (A), paper sheet or resin layer (B), foamed layer (C), paper sheet or resin layer (D) and paper sheet or resin layer (E) has specific MFI which relates to each other by the following relationship:

paper sheet or resin layer (A)≈paper sheet or resin layer (E);

paper sheet or resin layer (B)≈paper sheet or resin layer (D);

paper sheet or resin layer (A)≧paper sheet or resin layer (B);

paper sheet or resin layer (E)≧paper sheet or resin layer (D);

paper sheet or resin layer (B)≧foamed layer (C) and paper sheet or resin layer (D)≧foamed layer (C).

and, the relationship between the range of MFI is as shown in the following Table 2;

TABLE 2

| Layer | Range of MFI |
|-------|--------------|
| Paper sheet or resin layer (A) | 1.5~12 |
| paper sheet or resin layer (B) | 1~15 |
| foamed layer (C) | 0.5~7 |
| paper sheet or resin layer (D) | 1~5 |
| paper sheet or resin layer (E) | 1.5~12 |

3. The range of MFI of the materials of different layers is as shown in the following Table 3;

TABLE 3

| Material | Range of MFI | Material | Range of MFI |
|----------|--------------|----------|--------------|
| Polypropylene | 1~12 | Polyethylene | 0.05~6 |
| Silicon dioxide M.B | 1~15 | Antistatic agent M.B | 1~15 |
| Calcium carbonate M.B | 1~15 | Antiblocking agent M.B | 1~6 |
| Talcum powder M.B | 1~15 | Ultraviolet ray absorbent M.B | 0.5~7 |
| Barium sulfate M.B | 1~15 | Anti-Oxidation M.B | 0.5~15 |
| Diatomaceous earth M.B | 1~15 | | | wherein: MFI represents Melt Flow Index; and M.B. represents Master Batch

Among these materials the silicon dioxide, calcium carbonate, talcum powder, Barium sulfate, diatomaceous earth, antistatic agent, antiblocking agent, anti-oxidation agent and ultraviolet ray absorbent use polypropylene and polyethylene as carrier to form Master Batch, and the particle size selected for inorganic powders of silicon dioxide, calcium carbonate, talcum powder, Barium sulfate and diatomaceous earth shall be within the range of 0.05~15 μm. The range of concentration of the Master Batch so formed shall be within 15~75%.

4. In the 5-layer co-extrude biaxial-oriented polypropylene synthetic paper (15) of the invention the composition of the uppermost layer (A) of paper sheet or resin and the bottom layer (E) of paper sheet or resin both include polypropylene 96~36% by weight, polyethylene 0~30% by weight, antiblocking agent 2~5% by weight, titanium dioxide master batch (30~60%) 0~15% by weight, calcium carbonate master batch (40~70%) 0~15% by weight, ultraviolet ray absorbent 1~2% by weight, anti-oxidation agent 1~2% by weight; and the composition of the second layer (B) of paper sheet or resin and the forth layer (D) of paper sheet or resin both include polypropylene 97~54% by weight, polyethylene 0~15% by weight, titanium dioxide master batch (30~60%) 0~15% by weight, calcium carbonate master batch (40~70%) 0~15% by weight, antistatic agent 1~7% by weight, ultraviolet ray absorbent 1~2% by weight and anti-oxidation agent 1~2% by weight; and the intermediate foamed layer (C) has a composition including polypropylene 88~46% by weight, polyethylene 0~15% by weight, calcium carbonate master batch (40~70%) 5~15% by weight, titanium dioxide master batch (30~60%) 5~15% by weight, ultraviolet ray absorbent 1~2% by weight and anti-oxidation agent 1~2% by weight.

Figure 3:
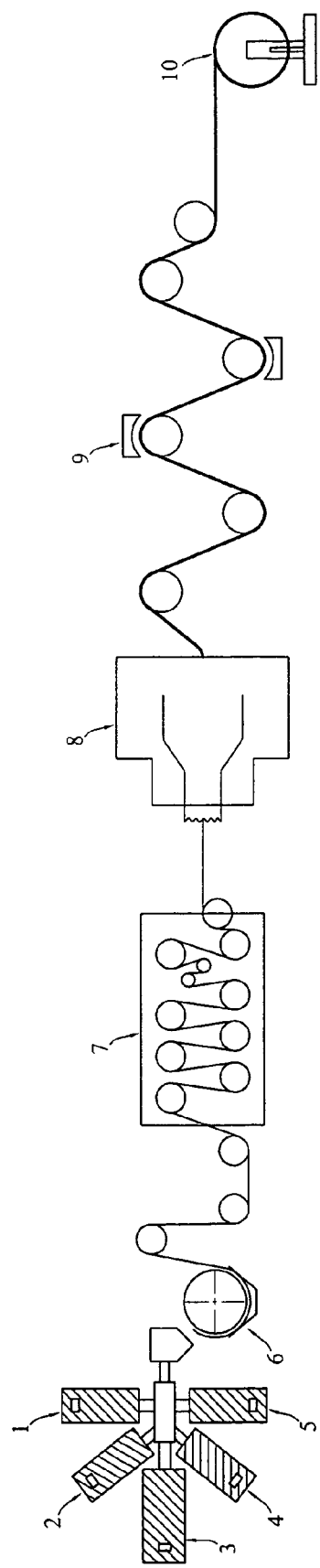
FIG. 3 is the flow diagram of the production process of the 5-layer co-extruded biaxial-oriented polypropylene synthetic paper of the invention.

Referring to FIGS. 2 and 3, the production process of the 5-layer co-extruded biaxial-oriented polypropylene synthetic paper (15) of the invention applies the 5-layer co-extruding biaxial-orientation process which is to produce 5-layer laminated structure with thickness between 30~300 μm for printing application as well as the base material of coating-type products having high added value.

The foamed layer (C) of the 5-layer co-extruded biaxial-oriented polypropylene synthetic paper (15) of the invention is produced by applying twin-screw primary extruder (3) equipped with venting device under temp. of 160~280° C. using the mixture which has a composition including polypropylene 88~46% by weight, polyethylene 0~15% by weight, calcium carbonate master batch (30~60%) 5~20% by weight, titanium dioxide master batch (30~60%) 5~20% by weight, ultraviolet ray absorbent 1~2% by weight and anti-oxidation agent 1~2% by weight which are uniformly mixed in the feeding hopper in front of the primary extruder (3) at first and then fed into the twin-screw primary-extruder for fine blending and air venting, then the mixture is pressed into the third layer runner of the T-die to form layer (C).

The paper sheet or resin layer (A) and the paper sheet or resin layer (E) of the 5-layer co-extruded biaxial-oriented polypropylene synthetic paper (15) of the invention are produced by two separate single-screw secondary extruders (1) and (5) both equipped with hopper venting device under temp. 160~280° C. using the mixture with composition including polypropylene 96~36% by weight, polyethylene 0~36% by weight, antiblocking agent 2~5% by weight, titanium dioxide master batch (30~60%) 0~15% by weight, calcium carbonate master batch (40~70%) 0~15% by weight, ultraviolet ray absorbent 1~2% by weight, anti-oxidation agent 1~2% by weight which are uniformly mixed in the feeding hopper in front of the separate secondary extruders (1) and 5 at first, and then fed into the single-screw secondary extruders (1) and (5) for fine blending and air venting. Then the mixture is pressed into the first and fifth layer runner of the same T-die.

The paper sheet or resin layer (B) and paper sheet or resin layer (D) of the 5-layer co-extruded biaxial-oriented polypropylene synthetic paper (15) of the invention are produced by two separate single-screw secondary extruders (2) and (4) both equipped with hopper venting device under temp. 160~280° C. using the mixture with composition including polypropylene 97–54% by weight, polyethylene 0~15% by weight, titanium dioxide master batch (30~60%) 0~15% by weight, calcium carbonate master batch (40~70%) 0~15% by weight, antistatic agent 1~7% by weight, ultraviolet ray absorbent 1~2% by weight and anti-oxidation agent 1~2% by weight which are uniformly mixed in the feeding hopper in front of the separate secondary extruders (2) and (4) at first, and then fed into the single-screw secondary extruders (2) and (4) for fine blending and air venting, then the mixture is pressed into the second and forth layer runner of the same T-die as mentioned above.

The 5-layer laminated structure produced by the T-die is then cooled under temperature of 15~70° C. to form sheet shaped product which is in turn drawn by a longitudinal orientation device (7) in longitudinal direction under temperature of 155~150° C. for a longitudinal enlargement of 2.5~7 times the original length. After that the product is drawn in lateral direction by a lateral orientation device (8) for a lateral enlargement of 5~15 times the original width under temperature of 140~200° C. Then let the product passes the corona treatment equipment (9) under an electric power of 20~120 KW for high frequency corona treatment to obtain uniform surface tension of the 5-layer co-extruded biaxial-oriented polypropylene synthetic paper (15) of which the thickness can be chosen within the range of 30~300 μm. Then the finished product is wound into roll by a winding machine (10) to form paper roll of 5-layer co-extruded biaxial-oriented polypropylene synthetic paper (15) with thickness which is chosen within the range of 30~300 μm.

EXAMPLE OF EMBODIMENT

Example 1

5-layer co-extruded biaxial-oriented polypropylene synthetic paper (15) having excellent printability of half-tone printing, lithographic printing, relief printing and intaglio printing on one side with thickness of 170 μm. The composition of each layer is as follows:

the uppermost paper sheet layer (A) has a composition including polypropylene (MFI:6) 48% by weight, polyethylene (MFI:0.05) 30% by weight, titanium dioxide master batch (40%) 15% by weight, calcium carbonate master batch (60%) 15% by weight antiblocking agent 2% by weight, anti-oxidation agent 1% by weight and ultraviolet ray absorbent 1% by weight;

the second layer paper sheet (B) has a composition including polypropylene (MFI:3) 71% by weight, calcium carbonate master batch (60%) 15% by weight, titanium dioxide master batch (40%) 15% by weight, antistatic agent 7% by weight, anti-oxidation agent 1% by weight, and ultraviolet ray absorbent 1% by weight;

the third layer (C) is a foamed layer which has a composition including polypropylene (MFI:2.4) 78% by weight, calcium carbonate master batch (60%) 15% by weight, titanium dioxide master batch (40%) 5% by weight, anti-oxidation agent 1% by weight, and ultraviolet ray absorbent 1% by weight;

the forth paper sheet layer (D) has a composition including polypropylene (MFI:3), 71% by weight, calcium carbonate master batch (40%) 15% by weight, antistatic agent 7% by weight, anti-oxidation agent 1% by weight, and ultraviolet ray absorbent 1% by weight; and the fifth paper sheet layer (E) has a composition including polypropylene (MFI:6) 95% by weight, antiblocking agent 3% by weight, anti-oxidation agent 1% by weight, and ultraviolet ray absorbent 1% by weight.

The physical property of the 5-layer co-extruded biaxial-oriented synthetic paper (15) of this example with thickness of 170 μm has the physical properties shown in the following Table 4:

TABLE 4

| Physical property | unit | Example 1<br>170 μm, single side glazed synthetic paper | Test method |
|---|---|---|---|
| Specific weight | — | 0.65 | ASTM D 1248 |
| Basis weight | g/m² | 115 | JIS P-8124 |
| Opacity | % | 95 | TAPPI T-425 |
| Glossiness | % | 25/117 | TAPPI T-480 |
| Roughness | % | 1.5/0.8 | TAPPI T-555 |
| Whiteness | % | 96 | TAPPI T-525 |
| Surface resistance | Ω | $10^{10} \sim 10^{12}$ | EN 45014 |

The 5-layer co-extruded biaxial-oriented polypropylene synthetic paper (15) with thickness of 170 μm has the following superiorities:

1. In case the specific weight of the 5-layer co-extruded biaxial-oriented synthetic paper (15) is to be lowered, four layers in the laminated structure can be arranged as foamed layer, but in the conventional 3-layer co-extruded biaxial—oriented polypropylene synthetic paper (20) only two layers can be arranged as foamed layer, so the 5-layer co-extruded biaxial-oriented polypropylene synthetic paper (15) has the superiority in eliminating the drawback of over-concentration of calcium carbonate at a specific layer that can increase the production speed, and lower the production cost.

2. The covering layer of the 5-layer co-extruded biaxial-oriented polypropylene synthetic paper (15) can be arranged into as many as four layers, but the 3-layer co-extruded biaxial-oriented polypropylene synthetic paper can only have as many as two layers arranged as covering layers, so the 5-layer co-extruded biaxial-oriented polypropylene synthetic paper (15) has the superiority of avoiding over-concentration of titanium dioxide in a specific covering layer that can increase the production speed and production efficiency.

3. In the 5-layer co-extruded biaxial-oriented polypropylene synthetic paper (15) all the additives such as antistatic agent can be added into the second layer (B) of paper sheet or resin which has smaller thickness or can be added into the forth layer (D) of paper sheet or resin, but in the conventional 3-layer co-extruded biaxial-oriented polypropylene synthetic paper (20) the antistatic agent can only be added into the foamed layer (B1) which has greater thickness, so the 5-layer synthetic paper (15) has the superiority of reducing the material cost incurred by additives.

Example 2

5-layer co-extruded biaxial-oriented polypropylene synthetic paper (15) with thickness of 90 μm having excellent printability of half-tone printing, lithographic printing, relief printing, intaglio printing as well as better stiffness, rigidity, glossiness and strength between layers than that of the 3-layers synthetic paper of which the inventor of the present invention has already been granted a patent in the past.

In this example the composition of the uppermost paper sheet layer (A) and the bottom paper sheet layer (E) both include polypropylene (MFI:6) 94% by weight, anti-oxidation agent 2% by weight, antiblocking agent 2% by weight and ultraviolet ray absorbent 2% by weight;

The composition of the second paper sheet layer (B) and the forth layer paper sheet (D) both include polypropylene (MFI:6) 93% by weight, antistatic agent 5% by weight, anti-oxidation agent 1% and ultraviolet ray absorbent 1% by weight;

The composition of the foamed layer (c) includes polypropylene (MFI:3) 68% by weight, calcium carbonate master batch (60%) 15% by weight, titanium dioxide master batch (40%) 15% by weight, anti-oxidation agent 1% by weight and ultraviolet ray absorbent 1% by weight.

The 5-layer co-extruded biaxial-oriented polypropylene synthetic paper (15) with Thickness of 90 μm in this example has the physical properties shown in Table 5.

TABLE 5

| Physical property | unit | Example 2<br>90 μm, both sides glazed synthetic paper | Test method |
|---|---|---|---|
| Specific weight | — | 0.85 | ASTM D 1248 |
| Basis weight | g/m² | 76 | JIS P-8124 |
| Opacity | % | 82 | TAPPI T-425 |
| Glossiness | % | 125/125 | TAPPI T-480 |
| Roughness | % | 0.4 | TAPPI T-555 |
| Whiteness | % | 88 | TAPPI T-525 |
| Surface resistance | Ω | $10^{12} \sim 10^{13}$ | EN 45014 |

The 5-layer co-extruded biaxial-oriented polypropylene synthetic paper (15) with thickness of 90 μm of this example has better rigidity, stiffness, surface glossiness and strength between layers as compared with the conventional 3-layer co-extruded biaxial-oriented polypropylene synthetic paper of the same thickness, covering power and specific weight.

What is claimed is:

1. A production process for producing a 5-layer co-extruded biaxial-oriented polypropylene synthetic paper with thickness between 30~300 μm whereby a 5-layer laminated structure is produced by employing a 5-layer co-extruded biaxial-oriented production process which comprises the following steps:

(a) an uppermost layer (A) of a paper sheet or resin and a bottom layer (E) of a paper sheet or resin are extruded separately by a first pair of two hopper venting type single-screw secondary extruders under a temperature between 160~280° C. by having a mixture containing polypropylene 96~36% by weight, polyethylene 0~30% by weight, antiblocking agent 2~5%, titanium dioxide master batch (30~60%) 0~15% by weight, calcium carbonate master batch (40~70%) 015% by weight, ultraviolet ray absorbent 1~2% by weight, anti-oxidation agent 1~2% by weight, uniformly blended at first in a feeding hopper in front of the single-screw secondary extruders, and then a first well blended mixture is fed into the first pair of single-screw secondary extruders for fine blending and air venting; then the first well blended mixture, being air vented by said first pair of single-screw secondary extruders, is pressed separately into a first layer runner and a fifth layer runner of a T-die;

(b) a second layer (B) of a paper sheet or resin and a fourth layer (D) of a paper sheet or resin are extruded separately by a second pair of two hopper venting type single-screw secondary extruders under temperature between 160~280° C. by having a mixture containing polypropylene 97~54% by weight, polyethylene 0~15% by weight, titanium dioxide master batch (30~60%) 0~15% by weight, calcium carbonate master batch (40~70%) 0~15% by weight, antistatic agent 1~7% by weight, ultraviolet ray absorbent 1~2% by weight, anti-oxidation agent 1~2% by weight uniformly blended at first in a feeding hopper in front of the second pair of single-screw secondary extruders, and then a second well blended mixture is fed into the second pair of single-screw secondary extruders for fine blending and air venting, then the second well blended mixture, which is air vented by the single-screw secondary extruders, is pressed into a second layer runner and a fourth layer runner of the T-die referred to in step (a);

(c) a third layer (C) of a foamed layer is extruded by a twin-screw primary extruder equipped with venting device under temperature between 160~280° C. by having a mixture containing polypropylene 88~46% by weight, polyethylene 0~15% by weight, calcium carbonate master batch (40~70%) 5~20% by weight, titanium dioxide master batch (30~60%) 5~20% by weight, ultraviolet ray absorbent 1~2% by weight a feeding hopper in front of the twin-screw primary extruder for fine blending and air venting, and then the mixture, well blended and air vented by the twin-screw primary mixture, is pressed into a third layer runner of the T-die referred to in step (b);

(d) a 5-layer laminated structure obtained from a co-extruding process by the T-die referred to in step (c) then passes a cooling and forming equipment to form a 5-layer laminated sheet under temperature range of 15~17° C.;

(e) the 5-layer laminated sheet obtained from step (d) is then introduced into a longitudinal orientation device for longitudinal drawing under temperature range of 155~150° C. for a longitudinal enlargement of 2.5~7 times the original length;

(f) the 5-layer laminated sheet obtained from step (e) is then introduced into the lateral orientation device for lateral drawing under temperature range of 140~200° C. for a lateral enlargement of 5~15 times the original width;

(g) then the 5-layer laminated sheet obtained from step (f) in which the longitudinal and lateral orientation of the 5-layer laminated sheet are completed is treated by corona treatment equipment; and (h) a finished product of 5-layer co-extruded biaxial-oriented polypropylene synthetic paper with a thickness between 30~300 μm is wound into a roll by a winding machine.

2. The process for producing 5-layer co-extruded biaxial-oriented polypropylene synthetic paper according to claim 1, wherein additives of inorganic powder for preparing a master batch referred to in step (c) is selected from the group of calcium carbonate including heavy or light weight, titanium dioxide including A-type or R-type, diatomaceous earth, clay, calcium oxide, silicon dioxide and barium sulfate which pass a surface treatment process, and then is blended to form said master batch with a particle size between 0.05~15 μm.

3. The process for producing the 5-layer co-extruded biaxial-oriented polypropylene synthetic paper according to claim 1, wherein a single twin-screw extruder is employed, and one or more than one kind of a mixture of additives and inorganic powder is directly added into the single twin-screw extruder from a side feeding hopper instate of pre-making the master batch referred to in step (c) with different additives and inorganic powder.

* * * * *